United States Patent [19]

Kalbfleisch

[11] 4,175,580
[45] Nov. 27, 1979

[54] BOTTOM ENTRY POSITIVE ACTING BALL VALVE

[76] Inventor: Adolphe W. Kalbfleisch, Box 64, Jeannette, Pa. 15644

[21] Appl. No.: 853,120

[22] Filed: Nov. 21, 1977

[51] Int. Cl.² ............................ F16k 43/00; F16k 5/00
[52] U.S. Cl. .................................. 137/315; 251/148; 251/315
[58] Field of Search ............................ 137/315, 454.2; 251/148, 150, 151, 152, 315, 316, 317

[56] References Cited

U.S. PATENT DOCUMENTS

| | | | |
|---|---|---|---|
| 3,056,577 | 10/1962 | Kalisek | 251/317 |
| 3,083,945 | 4/1963 | Shafer et al. | 251/315 |
| 3,112,758 | 12/1963 | Norton | 137/315 |
| 3,185,489 | 5/1965 | Klinger-Lohr | 251/315 |
| 3,195,560 | 7/1965 | Pofit | 137/315 |
| 3,284,046 | 11/1966 | Allenbaugh, Jr. | 251/315 |
| 3,323,542 | 6/1967 | Magos et al. | 251/151 |
| 3,428,292 | 2/1969 | Scaramucci | 251/315 |
| 3,540,693 | 11/1970 | Wise | 251/315 |
| 3,642,247 | 2/1972 | Scaramucci | 251/148 |
| 3,647,179 | 3/1972 | Scaramucci et al. | 251/315 |
| 3,981,482 | 9/1976 | Callahan, Jr. et al. | 251/315 |

Primary Examiner—Martin P. Schwadron
Assistant Examiner—G. L. Walton
Attorney, Agent, or Firm—Parmelee, Miller, Welsh & Kratz

[57] ABSTRACT

A valve assembly having a housing which includes a central, substantially cylindrical body part and a pair of end connector parts is provided in which the body part defines a through-flow fluid passageway, the end connector parts define upstream and downstream fluid flow passages, and each connector part is adapted to position an annular, ball-seating-sealing gasket. A ball is operatively carried within the passageway of the body part for opening and closing movement in operating engagement with the seating-sealing gaskets.

A bottom entry stem is utilized in positive latching engagement with the ball, as effected by at least three cooperating pairs of complementary, side-engaging, depthwise extending wall surfaces which substantially preclude endwise float of the ball between the seating gaskets, permit pivotal insertion and removal of the ball from the body, and permit radial, in-latching float of the ball with respect to the longitudinal axis of the stem.

17 Claims, 10 Drawing Figures

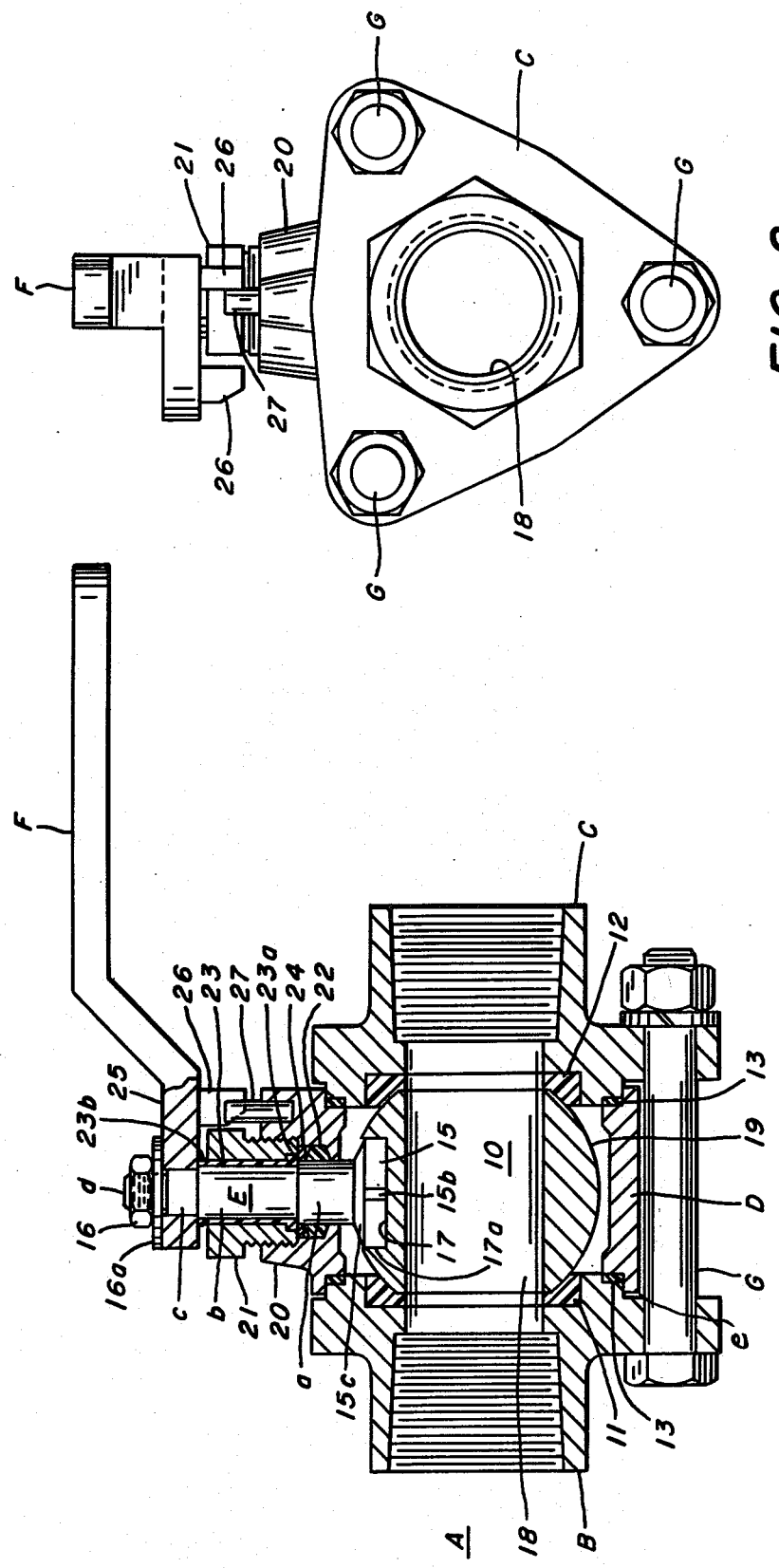

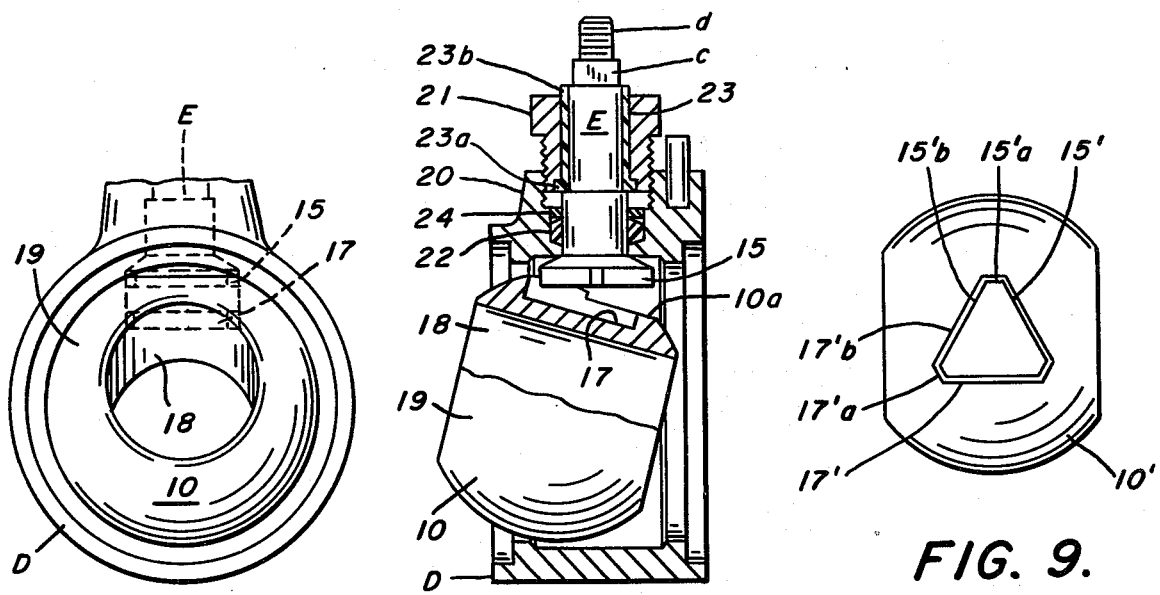
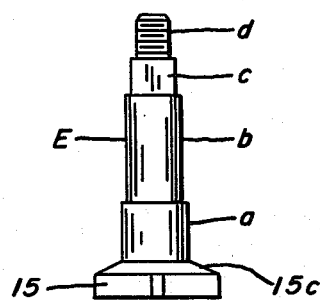
FIG. 4.
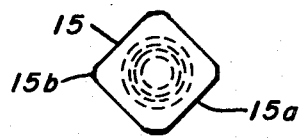
FIG. 5.
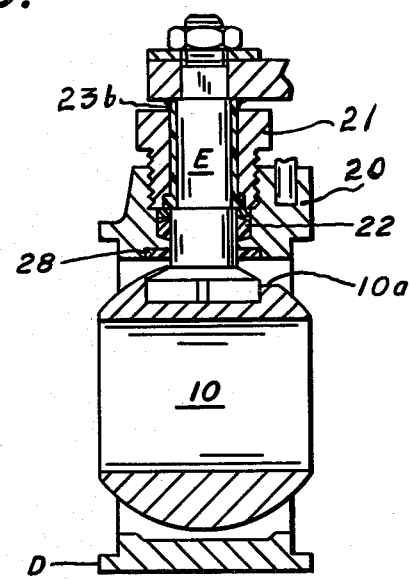
FIG. 8.
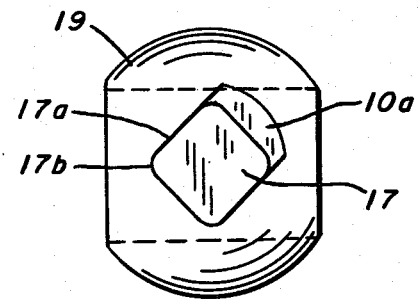
FIG. 6.
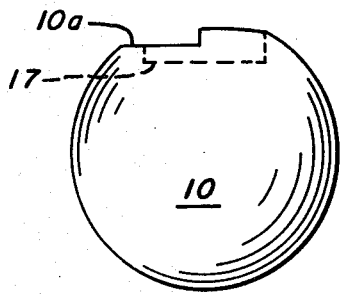
FIG. 7.

BOTTOM ENTRY POSITIVE ACTING BALL VALVE

BACKGROUND OF THE INVENTION

1. Field of the Invention

This invention relates to an improved ball valve of a bottom entry stem type having a positive, improved interfitting latching or splined engagement of its operating stem and particularly, to a valve in which its operating stem has a substantially fully side-enclosed, detachable, tongue and recess slide-in fit within its ball. Another phase of the invention relates to a fail-safe ball valve construction in which positive elimination of stem outshoot is assured, and an improved sealing action is attained at its stem gland and which may be effective even when the gland nut is loosened.

2. Description of the Prior Art

There have been two types of ball valve assemblies from the standpoint of the operating stem. One type which facilitates the removal of the internal elements has been designated as a top entry stem type. The other has been designated as a bottom entry type and has the advantage of being safer from the standpoint of avoiding the danger of pressure-forcing the stem out of the valve body. The top entry type is more likely to develop leakage, is dangerous in that it permits stem shoot-out under pressure, and presents difficulty in endeavoring to turn the ball to a closed position when the mounting gland becomes loose, fails or releases the stem.

However, the bottom entry type which has an outer entry to the ball has been disadvantageous from the standpoint of an endwise-floating, upstream-downstream type of mounting engagement between the stem and the ball. This is inherent due to the heretofore seeming need for a so-called endwise-extending, open-end or through-extending latching slot in the outer wall of the ball to enable its entry and release from the latching end of the stem when the ball is to be entered into an operating relation within and to be removed from within the body. One type of slot has a depth that is at a maximum at its mid or central portion and that slopes in a curved bottom path of decreasing depth towards its opposite, longitudinal open end portions. Another type is substantially planar between its open ends along its endwise extending bottom portion. Both permit endwise float of the ball with respect to the stem.

More specifically, it is customary in the bottom entry stem type of valve to provide an elongated slot in the ball which is open at its ends from the cross sectional center of the slot in an elongated manner towards both ends thereof, outwardly into the rounded or spherical circumferential wall surface of the ball. See, for example, FIG. 5 of Alvarez U.S. Pat. No. 3,614,056. The extent of the slot is limited by the size of the ball to avoid interference with the two surfaces which are adapted, with opposed, end-positioned, annular gaskets, to always seat on its rounded surface and close-off the valve. Such a construction inherently provides an endwise-slidable, frictional side wall fit between two opposed elongated sides of endwise-outwardly reduced depth of the latching slot in the ball, and thus of cooperating latching flange engagement of the stem with the slot. This is accentuated when both the base of the slot and of the stem flange have an upwardly curved slope endwise thereof. There is thus the danger of spalling the side edges of the ball by a tendency, during heavy duty operating conditions, for the latching flange of the stem to turn with respect to a lesser depth end portion of the opposed sides of the slot. This is particularly true, since the ball has a floating relationship within the body, endwise in the direction of fluid flow, either in its open position (See FIG. 1 of Alvarez) or in its closed position (see column 2, lines 47 to 52, of Scaramucci U.S. Pat. No. 3,397,861), and may move into an off-centered relation with respect to the latching flange, such that only a minimum opposing side wall surface depth is in actual engagement.

It has heretofore thought to be necessary to provide an endwise-open, elongated slotted portion to permit the ball to be removed from a bottom entry stem that is removable only from within a flow opening in the body. Also, it has heretofore thought to be necessary to provide a certain amount of endwise play in the seating relation of the ball with respect to its end-positioned seating-sealing gaskets, but such play produces wear and tear on the gaskets and increases the danger of spalling damage to the ball under heavy duty operating conditions.

SUMMARY OF THE INVENTION

It has thus been an object of the invention to eliminate difficulties heretofore encountered in the use of a ball valve top entry stem and incorporate advantageous features of a bottom entry stem, but without the disadvantageous features that have heretofore been encountered in the use of either type.

Another object of the invention has been to discover how to avoid disadvantageous features of present day ball valves having a bottom entry valve stem construction, and provide an improved interlatching type of assembled relation between a bottom entry stem and ball valve.

A further object of the invention has been to devise a mounting construction and relation between a bottom entry stem and its associated ball, such that a substantially full or all side-enclosing complementary engagement may be attained between the latching end of the stem and the latching recess or slotted portion of the ball, but in such a manner as to permit the ball to be entered and removed from within its body while the stem is in a loosened position therein.

A further object of the invention has been to provide a fail-safe type of ball valve assembly in which the danger of a pressure shoot-out of the stem from the body is eliminated and an improved operating type of stem, gland and ball assembly is effected.

A still further object has been to determine what factors are needed to attain an improved ball valve construction.

These and other objects of the invention will appear to those skilled in the art from the illustrated embodiments and the claims.

BRIEF DESCRIPTION OF THE DRAWINGS

FIG. 1 is a vertical side section through a valve constructed in accordance with the invention, showing its parts or elements in their assembled operating relation;

FIG. 2 is an end view in elevation on the same scale as and of the valve of FIG. 1;

FIG. 3 is a side section in elevation through a central body of the valve of FIG. 1, with its stem in an outwardly raised position and its ball in an outwardly tilted position incident to its insertion or removal from the body;

FIG. 3A is an end view in elevation of the valve with its parts in the positions shown in FIG. 3;

FIG. 4 is a detail view in elevation of the stem of FIG. 4 showing its contour;

FIG. 5 is a bottom end or plan view of the stem of FIG. 4 showing its contour;

FIG. 6 is a top plan view and FIG. 7 is a side view in elevation of the ball shown in FIGS. 1, 3 and 3A;

FIG. 8 is a side section in elevation through the central body of a valve of slightly modified construction;

And, FIG. 9 is a top plan view showing a modified, somewhat triangular, interfitting, stem latching tongue and ball recess type of engagement.

DESCRIPTION OF THE PREFERRED EMBODIMENT

In carrying out the invention, a new and improved form of mounting is essentially provided from the standpoint of a ball 10 and its operating stem E, and also from the standpoint of the mounting of the operating stem with respect to the ball and within a boss or gland of a hollow, central valve enclosure or body part D. In FIGS. 1, 3 and 3A, the body D is shown of a one-piece, continuous, integral construction and as defining a unitary, central hollow part of a three-part housing assembly. The ball 10 is adapted to open and close-off an endwise flow of fluid through longitudinal open-end passageways defined by the body part D and its cooperating, endwise-positioned connector parts B and C. With particular reference to FIGS. 1 and 3, valve assembly A is shown provided with a pair of hollow end connector or upstream and downstream fitting parts B and C that are internally threaded for connecting upstream and downstream ends of the valve A to a fluid flow pipe system. The ball 10, of substantially round or spherical shape, is adapted to be operatively mounted within an open end bore 18 of the body part D that defines its through passageway, and between a pair of opposed, end-positioned, spaced-apart, seating and sealing rings or gaskets 11 and 12. It will be noted that the rings 11 and 12 are shown respectively positioned within offset or recessed inner end portions of the connector parts B and C to present seating-sealing faces on opposite sides of the ball 10 in surface engagement therewith.

The sealing faces of the rings 11 and 12 centrally operatively seat the ball 10 within the body part D for opening and closing movement of what may be termed its endwise-through-extending flow passageway defining bore 18. The rings 11 and 12 are so positioned as to at all times engage rounded outer surface portions of the ball 10, both to seal the inner portion of the body part D off from fluid flow when the valve A is in the open position of FIG. 1, and when the ball 10 has been rotated about 90° to fully close-off fluid flow through the bore 18 and between the connector parts B and C. The rings 11 and 12 may be of a suitable material such as Teflon (DuPont DeNemours). Other gaskets or washers 13, 22, 23, 28, etc. may also be of Teflon or any suitable material, preferably a resin material. Sleeve 23 may be of resin material or of a compatible metal material.

In the illustrated embodiment, the three parts B, C and D are maintained in an assembled relation by bolt and nut assemblies G that extend, as shown in FIGS. 1 and 2, through corners of flange portions of the connector parts B and C and across the body part D. Ring-like, end gaskets 13, shown of flattened shape, are positioned between the three parts to serve as end seals. End spacing, shown in FIG. 1 at the interfitting portions of the body D with respect to the connector parts B and C, enables a take-up adjustment of the seating-sealing accomplished by the seating rings 11 and 12. This may be accomplished by merely tightening the bolts of the assemblies G without the necessity of disassembling the valve A and disconnecting it from the pipe line system. As will be hereafter emphasized, an improved interfitting operating relation is enabled between an outer latching recess, slot or groove portion 17 in the wall of the ball 10 and a latching inner flanged end portion, enlarged tongue or spline 15 of the operating stem E that eliminates endwise float of the ball between the opposed, flow-through passageway-encircling seating rings 11 and 12. This minimizes wear and tear on the seating rings.

The body part D, at what may be termed on one side thereof, has a gland mounting, open-end boss 20 that is internally threaded to removably receive a sleeve-like gland nut 21 for retaining an annular resin gasket or stem packing ring 22 and a metal back-up or positioning washer 24. The annular stem packing ring or gasket 22 is located within an innermost portion of the bore of the boss 20, about a larger diameter portion a of through-extending, removable, bottom entry type of operating stem E. As shown in FIG. 4, the stem E has an inner or lower portion a of maximum diameter which is journaled within an innermost portion of the bore of the boss 20 and terminates in the latching tongue or spline 15. The stem E also has a central portion b that extends through the gland nut 21, is of greater length and of slightly smaller diameter than the portion a, and at its outer or upper end connects with a wrench flat portion c.

An operating handle F has a slightly offset mounting end portion 25 (see FIG. 1), whose through-extending slot has a wrench-flat-shaped wall to fit on the wrench flat portion c of the stem E for rotating the stem and thus, for opening and closing the ball 10. A nut 16 and a washer 16a cooperate with a threaded outer end portion d of the stem E to removably secure the mounting portion 25 in position. The stem E is not only fluid-sealed in an operating position within the gland assembly by the gasket or packing ring 22, but in a supplemental manner by a sleeve-like bearing element 23. At its lower end, the sleeve 23 has a collar or rim flange 23a that is inset within a recess in the gland nut 21'. The sleeve 23 is adapted to extend towards its outer end within, along, and outwardly from the gland nut 21 and between it and portion b of the stem E. As indicated in FIGS. 1 and 3, the sleeve 23 has an end portion 23b that extends outwardly from the upper or outer end of the gland nut 21 to, as will be later further explained, provide a supplemental fluid sealing-off action, as well as a locking action on the stem E, as positioned within the gland.

The mounting end portion 25 of the operating handle F, on its underside, is adapted to engage or abut the outer, extending end portion 23b of the sleeve 23 and when tightened-down on the stem E by the mounting nut 16 and washer 16a, may be employed to longitudinally or axially compress the sleeve 23. The sleeve may thus be employed as a supplemental bearing for the stem E and as a sealing and locking means for the gland. Its outwardly extending end portion 23b (see FIG. 3) tends to roll transversely outwardly on the end face of the gland nut 21 and increase the sealing-off action of the gland when compression is exerted on it by further tightening the portion 25 down by means of the nut 16.

A highly important feature of the invention is involved in the construction and complementary mounting of the latching tongue or spline portion 15 of the stem E with respect to and within cooperating depressed or slotted latching recess portion 17 of the ball 10. It has been found to be essential to provide a fitted relation between the two such that all side wall length portions of the tongue or spline 15 are in a surrounded, substantially complementary, "in" and "out" slidable abutting relation with respect to and along depthwise side wall length portions of the latching recess, slot or groove portion 17, and that the relation should be maintained by at least three pairs of cooperating side wall portions in an angular connected relation with respect to each (see FIG. 9).

As illustrated in FIGS. 1, 3, 3A, 5 and 6 the latching slot 17 and the latching spline or tongue 15 are adapted to slide-pivot "in" and "out" with respect to each other, and have cooperating longer, main side wall length portions 17a and 15a, and shorter, angular, connecting end or corner wall portions 17b and 15b that are flattened and may be slightly rounded. They are shown as substantially planar. It is essential in the tongue and recess assembly that the side walls of the recess portion 17 fully encircle or surround and define a closed angular shape or area about the latching spline or tongue 15. The depth of the major recess 17 is such that the latching tongue 15 may have its side wall portions substantially fully depthwise slidably movable into and out of engagement within the recess 17.

In the illustrated embodiment of FIGS. 3, 3A and 4 to 6, inclusive, three side wall length portions 17a of the recess portion 17 are all shown substantially of equal depth along their full extents, as are connecting corner or end portions 17b. Ideally, uppermost or outermost portion 15c of the tongue or spline 15 has a convex taper, curvature or slope that substantially corresponds to that of the ball 10, such that the tongue will substantially define a curved continuation of the ball when the stem E and the ball 10 are in their fully assembled operating relation of FIG. 1. It will be noted that the cooperating pairs of side wall length portions 15a, 17a and 15b, 17b are shown as substantially planar.

To limit movement of the stem E between a position at which the ball 10 is in full, open alignment as to its passageway bore 18 with respect to the flow passageways in the end connector parts B and C, and a 90° position at which the opposed wall portions of the ball 10 fully close-off the passageways through both the end connectors, stop means is shown. In this connection, a stop or limit pin 27 (see FIGS. 1 and 2) is mounted to extend upwardly or outwardly from the outer end face of the boss 20, and the mounting end portion 25 of the operating handle F is provided with a pair of spaced-apart, inwardly or downwardly projecting stop lugs 26 for engagement with the pin 27 when the handle F is turned between its extreme positions through 90°.

As shown in FIGS. 1 and 3, the latching slot portion 17 in the ball 10 extends through its body to a depth sufficient to provide major side wall lengths of a depth width at least equal to those of the spline or tongue 15. In this embodiment, see also FIGS. 6 and 7, the ball 10 may be cut or sliced-off along a slight planar depth across its recess portion 17 to define a planar bibb or shelf portion 10a that extends from one wide side wall 17a. The portion 10a facilitates pivotal or tilting "in" and "out" insertion and removal of the ball 10 from the central body D (see FIGS. 3 and 3A) when four (or more) sides are involved as shown in FIGS. 5 and 6. In the embodiment of FIG. 9, a three sided assembly is designated by similar reference numerals but with prime suffixes; no cut-off shelf is shown and the construction is such that the upper side of the latching tongue 15' may be curved to form a fully convex rounding corresponding to a continuation of the outer surface of the ball 10'.

When it is desired to disassemble the valve A of FIG. 1, at least one of the connector parts B or C and the corresponding seating-sealing gasket 11 or 12 may be removed to expose one open end portion of the central body part D. The gland nut 21 is loosened and the stem E is then moved axially outward and held in an outermost position at which the outer or upper side 15c of its spline 15 abuts the inside wall of the boss 20. The ball 10 is turned to align one of its side wall length portions 17a and an interlatched cooperating side wall length portion 15a of the tongue or spline 15 into substantially crosswise alignment with the exposed open end of the central body part D. After this has been done, the ball 10 may then be pivotally tilted along or at opposite, now cross-aligned adjacent pairs of corner portions 15b and 17b and outwardly (see FIGS. 3 and 3A) through the exposed open end of the central body part D. Although the spline 15 may not clear the edges of the recess 17 when it is raised axially outwardly to the maximum extent in which its top portion 15c abuts the wall of the passageway or bore through the central body part D, the above pivot-tilt, slide-out procedure is effective in providing an easy removal of the ball 10. To mount the ball in position, the procedure is of course reversed by tilt-pivoting its recess 17 into latching engagement with the spline 15.

For larger size valve constructions, the substantially planar, inwardly offset shelf portion 10a has been found to facilitate removal and insertion of the ball 10; the tilting will be effected with the lip 10a in substantial cross alignment with an open end of the body part D (see FIG. 3). In effecting an "in" and "out" tilting insertion and removal of the ball 10 within a minimized spacing between the ball and the spline 15 of the stem E, it is important to employ pairs of opposed side tilt pivots, as provided by a pair of opposed corner portions 15b of the spline 15 and by a pair of opposed cooperating corner portions 17b of the recess 17 of the preferred embodiments of FIGS. 1 and 6. In the embodiment of FIG. 9, note the widening of the corner portions 15' to, in effect, provide a pair of pivotal-slide corners for insertion and removal of the ball 10'.

The corner portions 15b and 17b may also be of substantially planar and rounded shape but, in any event, define angle-shaped corners for the side wall length portions 15a and 17a that prevent rotative movement therebetween and facilitate slidable pivotal entry and removal of the spline 15 from the recess 17. The spline 15, as shown, is of larger size or diameter than the opening through the boss 20, thus preventing removal of the stem E except from the inside of the assembly. The spline 15, although of complementary shape with respect to the recess 17, will be of slightly smaller size for slidable, pivotal entry into and removal therefrom.

After the ball 10 has been removed, then the nut 16, the handle F, etc. may be removed to permit the stem to be moved endwise into the chamber of the body part D and removed outwardly through one end opening therein. The assembly of the valve A is accomplished in a reverse manner by first inserting the stem E, then holding it in an outermost position, while pivotally inserting the ball 10, then mounting the end connectors B and C and the seating rings 11 and 12 in position with respect to the central body D, and finally tightening-up the gland nut 21 and mounting the operating handle F on the end of the stem E.

In the modified construction shown in FIG. 8, an additional or secondary gasket 28 of flat, ring-like shape is shown positioned in a lower recess-like seat about the inner end of the boss 20. It serves to provide additional sealing action on the stem E, but importantly, will prevent a fluid flow out through the boss 20 even when the stem E is loose in its mounting, as when the gland nut 21 has been loosened or removed accidentally.

FIG. 9 illustrates that other enclosing angular, substantially complementary, latching spline and recess configurations may be employed in carrying out the invention. In accordance with the invention, a fully surrounding and maximum amount of ball and stem cooperating side wall latching engagement in relation to their sizes is attained. Also, packing gland failure will not affect opening and closing of the valve, and when the sleeve 23 is tightened-down, in addition to its other features, it locks the gland nut 21 in an adjusted position to prevent the gland from backing-out. Integrity of open and closed positions is maintained and overall valve life is extended. Also, as above indicated, outer stem packing may be removed without fluid leakage through the stem mounting while the valve A is in a connected fluid-carrying line, and whether or not the valve is in its open, fluid flow or closed position. Wear on the seating rings 11 and 12 is minimized, since end play of the ball 10 or 10' in the direction of fluid flow is inherently prevented. The latter feature is particularly important from the standpoint of the previously explained endwise adjustment that may be accomplished using the take-up clearance spacing e shown in FIG. 1 that is provided between the parts B, C and D of the valve housing.

With reference to FIG. 1 of the drawings, the provision and utilization of clearance spacing e between the central body part D and the connector parts B and C is important. It is attained by the use of resilient, interposed gasket rings or seals 13 of sufficient thickness to enable an effective take-up to compensate for usage wear on the ball seating-sealing rings or gaskets 11 and 12. Such spacing between the main or central body part D and the end fitting parts B and C, permits the bolt and nut assemblies G to be gradually tightened-down after long service periods of the valve on the line. Adjustment is accomplished when and if the valve shows signs of leakage due to normal wear of its seats and seals. A simple torquing of the bolts of the assemblies G provides the exact adjustment needed to restore the valve to its former leak-tight condition, and this can be repeated over and over to compensate for normal wear before it is necessary to disassemble parts of the valve housing and replace the seating-sealing rings or gaskets 11 and 12. At this time, the housing gaskets 13 may also be replaced. Such torquing is accomplished substantially evenly by noting the number of turns of each of the bolt and nut assemblies G. Each take-up torquing adjustment may be made to a point where free movement of the ball 10 is not adversely effected. The seating-sealing rings 11 and 12 thus may be efficiently and effectively used over a much longer service period. The ring-like, flat gaskets 13 cooperate with inner, opposed ledge portions between the end connector parts B and C and the central body part D to seal-off the joints therebetween in a spaced-apart relation with respect to each other. Such gasket means is resilient and compressible under force applied by the bolt means G in adjusting the spaced relation between the housing parts to compensate for wear on the pair of oppositely positioned ball seating-sealing rings 11 and 12.

I claim:

1. An improved bottom entry stem and ball valve assembly which comprises, an open-end passageway defining housing body, a boss having a bore open to the passageway from a side of said body, an axially extending operating stem mounted within the bore of said boss and having a latching spline at its inner end that is of larger diameter than the bore and that is positioned in the passageway of said housing body, a valve ball operatively positioned in said body and having a fluid flow passageway therethrough and a latching recess in its outer wall, said spline and recess each having at least three end-connected depthwise extending side wall length portions that define enclosing continuous side walls for said spline with at least one cooperating pair of "in" and "out" pivot-shaped corner portions and with side wall length portions of said recess fully encircling and providing a closed angular area about said spline, said spline and recess being substantially complementary in shape, and said spline being of slightly smaller size than said recess for pivotal-slidable entry into and removal from said recess when said ball is tilted at said recess from one end of the passageway of said housing body and with respect to a side wall length portion of said spline that is in a substantially cross-aligned position facing the one end of the passageway.

2. An improved ball valve assembly as defined in claim 1 wherein the diameter of the passageway of said body at said boss is such as to preclude straight radial slide-out latching disengagement and slide-in latching engagement of said spline with respect to said recess.

3. An improved ball valve assembly as defined in claim 1 wherein, said pairs of cooperating corner portions are of widened configuration to facilitate pivotal-slidable entry and removal of said spline from said recess.

4. An improved ball valve assembly as defined in claim 1 wherein, each of said side wall length portions of said spline and of said recess are substantially planar and are end-connected together by rounded-widened corners to define a continuous latching side wall, and an upper side of said spline has a curvature substantially conforming to the outer curvature of the wall of said ball.

5. An improved ball valve assembly as defined in claim 1 wherein said recess and said spline have four endwise-connected depthwise-extending side wall length portions, each of which is substantially planar, and said side length portions of said recess and of said spline are continuously connected together at their ends by somewhat widened cooperating corner portions.

6. An improved ball valve assembly as defined in claim 5 wherein said ball has a substantially planar inwardly offset shelf portion extending from one of its said side wall length portions to facilitate insert and removal of said recess with respect to said spline.

7. An improved bottom entry stem and ball valve assembly which comprises, a central body part having an open-end fluid passageway therethrough, an open-end boss extending from a side of said body part, an operating stem positioned to extend axially along said boss into the passageway of said body part, a ball positioned in the passageway of said body part and having a fluid-flow bore therethrough and a latching recess in its outer wall, said stem being enlarged at its inner end to provide a latching spline adapted to slidably fit in a complementary relation within said recess for rotating said ball within said body, said spline and recess each having a continuous depthwise extending side wall length and cooperating pivotally shaped corner portions defining a continuous enclosing side wall, said latching spline being of larger diameter than an inner open end of said boss for preventing removal of said stem outwardly through said boss, a gland and gland nut for rotatably mounting and sealing-off said stem within said boss; a sleeve gasket extending axially-endwise-inwardly along and between said gland nut and said stem for pressure engagement with said gland and, at its other end, extending outwardly beyond an outer end of said gland nut; and means mounted on an outer end of said stem for endwise-applying compression force to the outer end of said sleeve.

8. An improved ball valve assembly as defined in claim 7 wherein, said gland nut has a recess in its inner end portion, and said sleeve has a rim at its inner end adapted to fit within said recess.

9. An improved ball valve assembly as defined in claim 8 wherein said means for applying compression force to said sleeve comprises, an operating handle positioned on an outer end of said stem for engagement with the outer end of said sleeve, and a nut threadably mounted on the outer end of said stem for tightening said handle down against said sleeve.

10. An improved ball valve assembly as defined in claim 7 wherein: said stem has a cylindrical portion of larger diameter adjacent said latching spline and operatively positioned for rotation within said boss, has a central stem portion of intermediate diameter extending from said portion of larger diameter and operatively positioned within said sleeve to extend outwardly therefrom, and has an outer end portion extending from said intermediate portion that is of further reduced diameter; and an operating handle is mounted on said outer end portion of said stem.

11. An improved ball valve assembly as defined in claim 10 wherein said boss has a recess portion open to the fluid passageway through said body part, and a ring-shaped sealing gasket is positioned within said recess portion and about the larger portion of said stem for preventing fluid leakage through said boss when the stem is in a loosened position within its mounting.

12. An improved bottom entry stem and ball valve assembly which comprises, a valve housing having an open-end bore therethrough a ball positioned for rotation within the bore of said housing for opening and closing-off fluid flow therethrough, a pair of opposed spaced-apart seating-sealing rings positioned in said housing in cooperating engagement with said ball, a boss extending from a side of said housing and having a bore open into the bore of said housing, a ball operating stem, a gland operatively positioning said stem to extend therealong into the bore of said housing, said stem having a latching spline on its inner end, said ball having an outwardly open latching slot in its wall for pivotally-slidably receiving said spline therein, said spline and said recess each having depthwise extending side wall length portions connected by angular corners to define continuous enclosing side walls, the side wall of said spline being adapted to slidably pivotally interfit in latching engagement within the side wall of said recess, said spline being of larger diameter than the bore of said boss to preclude endwise removal of said stem outwardly therethrough, and an adjacent pair of corners of said recess being adapted to pivotally-slidably tilt about cooperating adjacent corners of said spline when said ball is radially tilted from an opposite side length portion of said recess with respect to said spline for moving said recess into and out of latching engagement with said spline.

13. An improved ball valve assembly as defined in claim 12 wherein, said housing is of three part construction and comprises an upstream connector part, a downstream connector part and a central body part within which said ball is positioned; one of said seating-sealing gaskets is positioned between said central body part and said upstream connector part, the other of said seating-sealing gaskets is positioned between said central body part and said downstream connector part, resilient gasket means is positioned between said body parts for maintaining them in a sealed spaced-apart relation with respect to each other, bolt means retains said parts in a connecting sealed-off relation with respect to each other, and said bolt means is adjustable to decrease the spaced-apart relation between said parts as resisted by the resiliency of said gasket means for compensating for usage wear of said seating-sealing gaskets in their engagement with said ball.

14. An improved ball valve assembly as defined in claim 13 wherein, a gland nut is adapted to threadably engage within the bore of said boss, a sleeve-like resilient element is positioned to extend along said stem within said nut, and means cooperates with said stem for axially compressing said sleeve element to tighten-down said stem within said gland into a ball operating position within said boss.

15. An improved ball valve assembly as defined in claim 14 wherein, a nut is adapted to be rotatably carried by an outer end of said stem for applying compression force to an outer end of said sleeve for axially compressing said sleeve into a latching-sealing relation between said stem and said gland nut.

16. An improved ball valve assembly as defined in claim 14 wherein, a ring gasket is carried within an inner portion of said boss in engagement with said stem and is adapted to be endwise compressed into sealing engagement with said stem by said gland nut, and said boss has an inner recess about said stem for receiving said ring gasket therein to provide a fluid sealing-off action about said stem that is substantially independent of the axial position of said stem within said gland.

17. In a ball valve assembly having a central body part and a pair of end connector parts that are adapted to be secured together to define a longitudinally open fluid passageway therethrough, having a substantially spherical valve ball adapted to be positioned within the central body part, having a bottom entry ball-operating stem, having a boss extending from a side of the central body part and provided with a bore therethrough for receiving the operating stem, having a pair of seating-sealing rings positioned between the end connector and central body parts for operatively seating the ball within the body part for rotative movement therein, the ball having an open bore extending therethrough for alignment with the fluid passageway when the ball is rotated to one position and for closing-off the passageway when the ball is rotated to a second position; the improvement which comprises, an outwardly removable gland adapted to operatively carry the stem in an axially extending relation within the boss, a latching spline on the inner end of the stem of larger diameter than the bore of the boss and positioned within the passageway of the body part, a latching recess within the wall of the ball to receive said spline therein and enable opening and closing movement of the ball by rotative operation of the stem, said latching recess having at least four depthwise-extending side wall length portions connected by rounded pivotal corner portions to define a continuous side wall, said spline having at least four depthwise-extending side wall length portions connected by rounded corner pivotal portions to define a continuous side wall; and the ball being adapted to be removed out of an operating position within the central body part by removing at least one end connector part and an associated seating-sealing ring to expose an end of the passageway through the central body part, by rotating the ball to a position at which one of said side wall length portions of said recess and a cooperating side wall length portion of said spline are in substantial crosswise alignment with the exposed end of the central body part, by moving the stem to an outer position within the boss, and then pivoting tilting the ball outwardly at adjacent pairs of said corner portions of said spline and recess that are then positioned opposite to said cross-aligned side wall length portions and out through the exposed end of the central body part.

* * * * *